United States Patent
Lefenfeld et al.

(10) Patent No.: US 8,986,643 B2
(45) Date of Patent: *Mar. 24, 2015

(54) SILICIDE COMPOSITIONS CONTAINING ALKALI METALS AND METHODS OF MAKING THE SAME

(75) Inventors: Michael Lefenfeld, New York, NY (US); James L. Dye, East Lansing, MI (US)

(73) Assignees: Signa Chemistry, LLC, New York, NY (US); The Board of Trustees of Michigan State University, East Lansing, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 13/445,557

(22) Filed: Apr. 12, 2012

(65) Prior Publication Data

US 2012/0201734 A1  Aug. 9, 2012

Related U.S. Application Data

(60) Division of application No. 12/854,510, filed on Aug. 11, 2010, now Pat. No. 8,372,371, which is a continuation of application No. 11/151,661, filed on Jun. 14, 2005, now Pat. No. 7,811,541.

(60) Provisional application No. 60/578,818, filed on Jun. 14, 2004, provisional application No. 60/667,693, filed on Apr. 4, 2005.

(51) Int. Cl.
*C01B 3/06* (2006.01)
*C01B 3/08* (2006.01)
*C01B 33/06* (2006.01)

(52) U.S. Cl.
CPC ... *C01B 3/06* (2013.01); *C01B 3/08* (2013.01); *C01B 33/06* (2013.01); *Y02E 60/364* (2013.01)
USPC ........................................... 423/344

(58) Field of Classification Search
CPC ............ C01B 33/06; C01B 3/06; C01B 3/08; Y02E 60/366
USPC ............... 423/326, 332, 334, 344, 657, 658.2
IPC ........................................................ C01B 25/01
See application file for complete search history.

(56) References Cited

U.S. PATENT DOCUMENTS 1,665,264 A  4/1928  Holmes et al.
1,939,647 A  12/1933  Arnold et al.

(Continued)

FOREIGN PATENT DOCUMENTS

DE     101 55 171 A1   6/2002
GB     1 407 284 A     9/1975

(Continued)

OTHER PUBLICATIONS

Machine translation of Kuroshima (JP11-293460).*

(Continued)

*Primary Examiner* — Jun Li
(74) *Attorney, Agent, or Firm* — J.A. Lindeman & Co., PLLC (57) ABSTRACT

The invention relates to a method of making alkali metal silicide compositions, and the compositions resulting from the method, comprising mixing an alkali metal with silicon and heating the resulting mixture to a temperature below about 475° C. The resulting compositions do not react with dry $O_2$. Also, the invention relates to sodium silicide compositions having a powder X-ray diffraction pattern comprising at least three peaks with 2Theta angles selected from about 18.2, 28.5, 29.5, 33.7, 41.2, 47.4, and 56.2 and a solid state $^{23}$Na MAS NMR spectra peak at about 18 ppm. Moreover, the invention relates to methods of removing a volatile or flammable substance in a controlled manner. Furthermore, the alkali metal silicide compositions of the invention react with water to produce hydrogen gas.

7 Claims, 6 Drawing Sheets

(56) References Cited

U.S. PATENT DOCUMENTS

| | | |
|---|---|---|
| 1,997,340 A | 4/1935 | Osborg |
| 2,378,290 A | 6/1945 | Drake et al. |
| 2,731,326 A | 1/1956 | Alexander et al. |
| 2,765,242 A | 10/1956 | Alexander et al. |
| 3,033,601 A | 5/1962 | Kloepfer et al. |
| 3,033,800 A | 5/1962 | Elliott, Jr. et al. |
| 3,079,234 A | 2/1963 | Jenkins et al. |
| 3,165,379 A | 1/1965 | Schwartz et al. |
| 3,274,277 A | 9/1966 | Bloch et al. |
| 3,322,495 A | 5/1967 | Magee |
| 3,489,516 A | 1/1970 | Kummerle |
| 3,493,341 A | 2/1970 | Le Page et al. |
| 3,507,810 A | 4/1970 | Sanborn et al. |
| 3,527,563 A | 9/1970 | Shanklin |
| 3,535,262 A | 10/1970 | Hubbuch et al. |
| 3,575,885 A | 4/1971 | Hunter et al. |
| 3,576,891 A | 4/1971 | Rosenthal |
| 3,658,724 A | 4/1972 | Stiles |
| 3,670,033 A | 6/1972 | Izawa et al. |
| 3,679,605 A | 7/1972 | Sanford et al. |
| 3,793,382 A | 2/1974 | Higuchi et al. |
| 3,794,712 A | 2/1974 | Aboutboul et al. |
| 3,801,705 A | 4/1974 | Krekeler et al. |
| 3,878,289 A | 4/1975 | Beavon |
| 3,915,995 A | 10/1975 | Holmes et al. |
| 3,954,896 A | 5/1976 | Shima et al. |
| 4,087,477 A | 5/1978 | Tazuma et al. |
| 4,168,247 A | 9/1979 | Hayden et al. |
| 4,248,741 A | 2/1981 | Wernli et al. |
| 4,353,815 A | 10/1982 | Antos |
| 4,366,091 A | 12/1982 | Antos |
| 4,394,302 A | 7/1983 | Miller et al. |
| 4,413,156 A | 11/1983 | Watts, Jr. et al. |
| 4,435,606 A | 3/1984 | Motz et al. |
| 4,440,631 A | 4/1984 | Togari et al. |
| 4,446,251 A | 5/1984 | Bartley et al. |
| 4,471,075 A | 9/1984 | Bartley et al. |
| 4,508,930 A | 4/1985 | Wideman et al. |
| 4,633,029 A | 12/1986 | Tillett, Jr. et al. |
| 4,737,161 A | 4/1988 | Szydlowski et al. |
| 4,769,501 A | 9/1988 | Iwahara |
| 4,837,194 A | 6/1989 | Hayden |
| 4,975,405 A | 12/1990 | Okamura et al. |
| 4,982,044 A | 1/1991 | Smith |
| 5,008,480 A | 4/1991 | Slaugh |
| 5,128,291 A | 7/1992 | Wax et al. |
| 5,292,985 A | 3/1994 | Lattner et al. |
| 5,593,640 A | 1/1997 | Long et al. |
| 5,741,999 A * | 4/1998 | Kazumi et al. ............ 149/35 |
| 5,856,262 A | 1/1999 | Flick et al. |
| 6,022,823 A | 2/2000 | Augustine et al. |
| 6,096,934 A | 8/2000 | Rekoske |
| 6,103,403 A * | 8/2000 | Grigorian et al. ............ 428/641 |
| 6,191,059 B1 | 2/2001 | Varanasi |
| 6,309,620 B1 | 10/2001 | Schlegel et al. |
| 6,358,488 B1 | 3/2002 | Suda |
| 6,399,528 B1 | 6/2002 | Krell et al. |
| 6,403,852 B1 | 6/2002 | Yamamoto et al. |
| 6,423,286 B1 | 7/2002 | Gryko |
| 6,492,014 B1 | 12/2002 | Rolison et al. |
| 6,497,973 B1 | 12/2002 | Amendola |
| 6,534,033 B1 | 3/2003 | Amendola et al. |
| 6,544,400 B2 | 4/2003 | Hockaday et al. |
| 6,548,711 B2 | 4/2003 | Yamamoto et al. |
| 6,586,636 B2 | 7/2003 | Kelly |
| 6,706,928 B2 | 3/2004 | Kelly |
| 6,745,801 B1 | 6/2004 | Cohen et al. |
| 6,746,496 B1 | 6/2004 | Kravitz et al. |
| 6,818,334 B2 | 11/2004 | Tsang |
| 6,821,499 B2 | 11/2004 | Jorgensen |
| 6,901,302 B2 | 5/2005 | Kami |
| 6,904,533 B2 | 6/2005 | Kuo et al. |
| 6,932,847 B2 | 8/2005 | Amendola et al. |
| 6,939,529 B2 | 9/2005 | Strizki et al. |
| 7,052,671 B2 | 5/2006 | McClaine et al. |
| 7,074,509 B2 | 7/2006 | Rosenfeld et al. |
| 7,083,657 B2 | 8/2006 | Mohring et al. |
| 7,105,033 B2 | 9/2006 | Strizki et al. |
| 7,115,244 B2 | 10/2006 | Zhao et al. |
| 7,211,539 B2 | 5/2007 | Lefenfeld et al. |
| 7,271,567 B2 | 9/2007 | Dunn et al. |
| 7,393,369 B2 | 7/2008 | Shurtleff |
| 7,410,567 B2 | 8/2008 | Lefenfeld et al. |
| 7,648,786 B2 | 1/2010 | Shurtleff et al. |
| 7,670,698 B2 | 3/2010 | Eickhoff et al. |
| 7,811,541 B2 * | 10/2010 | Lefenfeld et al. ............ 423/344 |
| 2002/0090539 A1 | 7/2002 | Getty et al. |
| 2004/0191588 A1 | 9/2004 | Eshraghi et al. |
| 2006/0059778 A1 | 3/2006 | Shurtleff et al. |
| 2007/0020172 A1 | 1/2007 | Withers-Kirby et al. |
| 2007/0039815 A1 | 2/2007 | Bartel |
| 2007/0041897 A1 | 2/2007 | Eickhoff et al. |
| 2007/0124989 A1 | 6/2007 | Eickhoff et al. |
| 2007/0237995 A1 | 10/2007 | Eickhoff et al. |
| 2007/0272547 A1 | 11/2007 | Vanden Bussche et al. |
| 2009/0008089 A1 | 1/2009 | Zubrin et al. |
| 2010/0247426 A1 | 9/2010 | Wallace et al. |
| 2011/0311895 A1 | 12/2011 | Spare et al. |
| 2011/0313589 A1 | 12/2011 | Iyer et al. |

FOREIGN PATENT DOCUMENTS

| | | |
|---|---|---|
| JP | 1998119131 | 5/1988 |
| WO | WO 00/17104 | 3/2000 |
| WO | 2010114849 A1 | 10/2010 |
| WO | WO 2010/114849 A1 | 10/2010 |

OTHER PUBLICATIONS

International Search Report and Written Opinion of International Application No. PCT/US2010/029257, dated Jun. 1, 2010.

International Preliminary Report on Patentability of International Application No. PCT/US2010/029257, dated Oct. 13, 2011.

Partial European Search Report for EP 12187231.1 dated Dec. 18, 2012.

He, et al., NMR and X-ray Spectroscopy of Sodium—Silicon Clathrates, J. Phys. Chem. B 2001, 105, 3475-3485.

Mayeri, et al., NMR Study of the Synthesis of Alkyl-Terminated Silicon Nanoparticles from the Reaction of SiCl4 with the Zintl Salt, NaSi, Chem. Mater. 2001, 13, 765-770.

Partial European Search Report, for EP Application No. 12187231.1, mailed from the European Patent Office on Dec. 18, 2012, 7 pages.

Jaacov Levy et al: "Potassium Metal Dispersed on Silicia: A Versatile Reagent in Organic Chemistry", Angewandte Chemie. International Edition, VCH Verlag, Weinheim, DE, vol. 20, No. 12, Jan. 1, 1981, p. 1033.

Full European Search Report, for EP Application No. 12187231.1, mailed from the European Patent Office on May 3, 2013, 12 pages.

Office Action in JP Application No. 2012-149641 dated Sep. 16, 2014.

Cros et al., "Sur deux nouvelles phases du système silicium—sodium [Two new Phases of the Silicon—Sodium System]," C. R. Acad. Sc. Paris 260:4764-4767 (1965).

Gryko et al., "NMR Studies of Na Atoms in silicon clathrate compounds," Phys. Rev. B 54(5):3037-3039 (1996).

He et al., "NMR and X-ray Spectroscopy of Sodium—Silicon Clathrates," J. Phys. Chem. B 105:3475-3485 (2001).

Kishi et al., "Geometric and electronic structure of silicon—sodium binary clusters. I. Ionization energy of $Si_nNa_m$," J. Chem. Phys. 107(8):3056-3070 (1097).

Ma et al., "A versatile low temperature synthetic route to Zintl phase precursors: $Na_4Si_4$, $Na_4Ge_4$ and $K_4Ge_4$ as examples," Dalton Transactions, pp. 1-6, The Royal Society of Chemistry (2009).

Mayeri et al., "NMR Study of the Synthesis of Alkyl-Terminated Silicon Nanoparticles from the Reaction of $SiCl_4$ with the Zintl Salt, NaSi" Chem. Mater. 13:765-770 (2001).

Novotny et al., "Über eine ternäre Verbindung im System Aluminium—Silizium—Natrium [A Ternary Compound in the System Aluminum—Silicon—Sodium]," Metallforsch. 2:76-80 (1947).

(56) References Cited

OTHER PUBLICATIONS

Savin et al., "Pseudopotential Calculations on Alkali Silicide Clusters with $Si_2$ and Tetrahedral $Si_4$ Backbones," J. Am. Chem. Soc. 110:373-375 (1988).
Witte et al., "Die Kristallstruktur von NaSi und NaGe," Zeit Anorgan Allege Chemie 327:260-273 (1964).
International Search Report from PCT/US04/39304, dated Jan. 6, 2006.
International Search Report from PCT/US2005/20766, dated May 2, 2006.
Office Action and Search Report from corresponding European Patent Application No. 05785526.4, Sep. 29, 2010.
J. Witte et al.; English Translation of "The Behavior of Alkali Metals Relative to Semimetals XI, The Crystal Structure of NaSi and NaGe", Z. anorg. allg. Chem. 327:260-273, 1964. (Originally submitted in German).

* cited by examiner

SILICIDE COMPOSITIONS CONTAINING ALKALI METALS AND METHODS OF MAKING THE SAME

RELATED APPLICATION DATA

This application is a divisional of U.S. patent application Ser. No. 12/854,510, filed Aug. 11, 2010, which is a continuation of U.S. patent application Ser. No. 11/151,661, filed Jun. 14, 2005, which claims benefit of priority of Provisional Application Ser. Nos. 60/578,818 filed Jun. 14, 2004 and 60/667,693 filed Apr. 4, 2005, the entire disclosures all of which are incorporated herein by reference.

FIELD OF THE INVENTION

The invention relates to alkali metal silicide compositions made by the interaction of alkali metals with silicon at temperatures below about 475° C. The compositions provide a stable source to reduce water, producing a source of pure hydrogen gas.

BACKGROUND OF THE INVENTION

Alkali metals are very reactive in their metallic or neutral state. Alkali metals are very reactive toward air and moisture and may catch fire spontaneously when exposed to these agents. To avoid the inherent hazards associated with their activity, the neutral metal must often be stored in vacuo or under an inert liquid such as oil in order to protect it from contact with the atmosphere, which may result in oxidation or other reactions. For example, sodium metal is often stored in Nujol oil which must, to avoid unwanted impurities, be removed prior to use in chemical reactions. This places severe restrictions on its shipment and use.

A number of compounds between alkali metals and silicon compounds have been prepared. For example, known compounds between sodium (Na) and silicon (Si) exist with stoichiometries that range from NaSi to Na(Si)$_6$ (which is believed to be Na$_8$Si$_{46}$) to Na$_x$Si$_{136}$, with 1.5<x<24. (See Witte, J.; Schnering, H. G., "The Crystal Structure of NaSi and NaGe (in German)" *Zeit Anorgan Allege Chemie* 1964, 327, 260-273., Cros, C.; Pouchard, M.; Hagenmueller, P., "Two new Phases of the Silicon-Sodium System. (in French)" C. R. *Acad. Sc. Paris* 1965, 260, 4764-4767., and He, J.; Klug, D. D.; Uehara, K.; Preston, K. F.; Ratcliffe, C. I.; Tse, J. S., "NMR and X-ray Spectroscopy of Sodium-Silicon Clathrates" *J. Phys. Chem. B* 2001, 105.). The known compounds are formed by heating Na with Si to high temperatures, always at or above 500° C., and in some cases with removal of Na vapor by condensation on a cold surface. (See He, J.; Klug, D. D.; Uehara, K.; Preston, K. F.; Ratcliffe, C. I.; Tse, J. S., "NMR and X-ray Spectroscopy of Sodium-Silicon Clathrates" *J. Phys. Chem. B* 2001, 105, and Mayeri, D.; Phillips, B. L.; Augustine, M. P.; Kauzlarich, S. M., "NMR Study of the Synthesis of Alkyl-Terminated Silicon Nanoparticles from the Reaction of SiCl$_4$ with the Zintl Salt, NaSi" *Chem. Mater.* 2001, 13, 765-770.). Mayeri et al. react silicon in the presence of sodium to a temperature of about 650° C. to form a sodium silicide. There have also been reports that a silicide of nominal composition NaSi$_2$ can be prepared by heating Na with quartz (SiO$_2$), although the evidence for this composition is slim. (See Novotny, H.; Scheil, E., "A Ternary Compound in the System Aluminum-Silicon-Sodium (in German)" *Metallforsch.* 1947, 2, 76-80.).

It has often been assumed that NaSi is so reactive that it must be considered to be pyrophoric, or able to spontaneously ignite in the presence of air. It has also been recently characterized as "air and moisture sensitive." (See He, J.; Klug, D. D.; Uehara, K.; Preston, K. F.; Ratcliffe, C. I.; Tse, J. S., "NMR and X-ray Spectroscopy of Sodium-Silicon Clathrates" *J. Phys. Chem. B* 2001, 105.). This study showed, however, that the clathrate structure of Na$_8$Si$_{46}$ is non-reactive toward air and moisture. Id. However, it is generally agreed that the reaction of NaSi with water is rapid and "violent", such that the heat of reaction can ignite the hydrogen formed, just as occurs in the reaction of alkali metals with water. This places severe restrictions on storing and handling NaSi without keeping it in vacuo or under an inert atmosphere to avoid its inherent hazards.

A major problem with the synthesis of NaSi materials has been the need to heat Na and Si in a closed system to prevent the condensation of Na at cold sites. Conventionally, for example, to prepare polycrystalline NaSi powder, excess Na was heated with Si in a molybdenum (Mo) tube that was welded shut and heated for three days at 500° C. (See Mayeri, D.; Phillips, B. L.; Augustine, M. P.; Kauzlarich, S. M., "NMR Study of the Synthesis of Alkyl-Terminated Silicon Nanoparticles from the Reaction of SiCl$_4$ with the Zintl Salt, NaSi" *Chem. Mater.* 2001, 13, 765-770.). In another study, a stainless steel container was used. (See He, J.; Klug, D. D.; Uehara, K.; Preston, K. F.; Ratcliffe, C. I.; Tse, J. S., "NMR and X-ray Spectroscopy of Sodium-Silicon Clathrates" *J. Phys. Chem. B* 2001, 105.).

A need exists, therefore, to prepare an alkali metal silicide composition conveniently and inexpensively, so that it may be easily handled in air without a significant loss in its ability to reduce water. This reduction reaction would be able to produce large amounts of hydrogen per unit mass of the solid.

SUMMARY OF THE INVENTION

The invention relates generally to alkali metal silicide compositions, methods of making the alkali metal silicide compositions, and methods of using the alkali metal silicide compositions. Any alkali metal may be used in the practice of this invention, including Sodium (Na), Potassium (K), Rubidium (Rb), and Cesium (Cs).

Specifically, the invention relates to an alkali metal silicide composition comprising the product of mixing an alkali metal with powdered silicon in an inert atmosphere and heating the resulting mixture to a temperature below about 475° C., wherein the alkali metal silicide composition does not react with dry O$_2$. In this embodiment, the alkali metal silicide composition may be sodium silicide, such as Na$_4$Si$_4$, potassium silicide, such as K$_4$Si$_4$, and the like.

In addition, the invention relates to a sodium silicide composition having a powder X-ray diffraction pattern comprising at least three peaks with 2Theta angles selected from about 18.2, 28.5, 29.5, 33.7, 41.2, 47.4, and 56.2. Furthermore, the invention relates to a sodium silicide composition having a solid state $^{23}$Na Magic Angle Spinning (MAS) Nuclear Magnetic Resonance (NMR) spectra peak at about 18 ppm. In these embodiments, the sodium silicide may be Na$_4$Si$_4$, for example.

Moreover, the invention relates to a method of removing a volatile or flammable substance in a controlled manner, the volatile or flammable substance being in the presence of water, the method comprising the step of exposing the volatile or flammable substance to an alkali metal silicide composition, wherein the alkali metal silicide composition reacts exothermically with the water causing a controlled burn, thereby removing the volatile or flammable substance.

In addition, the invention relates to a method of removing a volatile or flammable substance in a controlled manner, the method comprising the steps of exposing the volatile or flammable substance to an alkali metal silicide composition, and exposing the alkali metal silicide composition to water, wherein the alkali metal silicide composition reacts exothermically with the water causing a controlled burn, thereby removing the volatile or flammable substance.

Furthermore, the invention relates to a method of making an alkali metal silicide composition comprising the steps of mixing an alkali metal with powdered silicon in an inert atmosphere and heating the resulting mixture up to a temperature below about 475° C., wherein the alkali metal silicide composition does not react with dry $O_2$.

In these embodiments, the alkali metal silicide composition may be sodium silicide, such as $Na_4Si_4$, potassium silicide, such as $K_4Si_4$, and the like. Also, the exothermic reaction between the alkali metal silicide composition and the water may consume or clean the volatile or flammable substance.

Moreover, the invention relates to a method for producing hydrogen gas comprising the step of contacting any of the alkali metal silicide compositions described herein with water.

DETAILED DESCRIPTION OF THE INVENTION

As is shown in the attached FIGS. 1-6 and described herein, the invention relates to alkali metal silicide compositions comprising the product of mixing an alkali metal with silicon in an inert atmosphere and heating the resulting mixture to a temperature below about 475° C., wherein the alkali metal silicide composition does not react with dry $O_2$. According to the processes described herein, the resulting composition can be used as a source of hydrogen by contacting the composition with water. While any alkali metal, including sodium (Na), potassium (K), cesium (Cs), or rubidium (Rb) may be used, it is preferred that the alkali metal used in the alkali metal silicide composition be either sodium or potassium. In addition, any type of silicon, powdered silicon, or crystalline powdered silicon may be used, for example, powdered crystalline silicon (Alfa Aesar, 325 mesh). The theoretical $H_2$ yield from a sodium silicide composition of the invention is approximately 0.098 kg $H_2$/kg NaSi, more than double the Department of Energy (DOE) 2005 target for hydrogen fuel sources and larger than the 2015 target of 0.081 kg $H_2$/kg fuel. Accordingly, sodium is the most preferred alkali metal, and sodium silicide is the most preferred alkali metal silicide composition.

Figure 1:
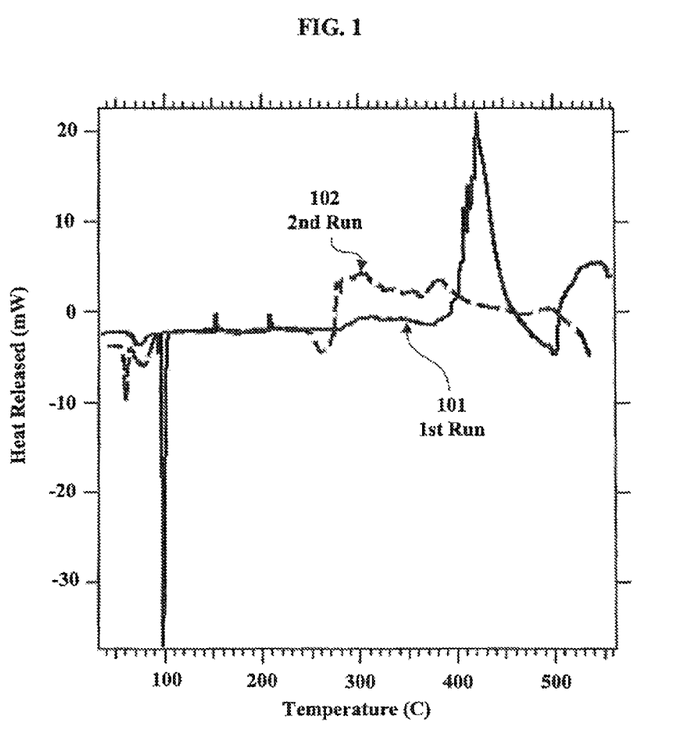
FIG. 1 shows a Differential Scanning calorimetry (DSC) pattern illustrating exothermic reactions between a mixture of Na and Si.

FIG. 1 illustrates a pair of exothermic reactions that occur between Na and Si in two temperature regions using a Differential Scanning calorimetry (DSC) display. The DSC results were obtained using a Shimadzu DSC-50 instrument, and the experiment was conducted in a sealed copper vessel. During the experiment, a mixture of stoichiometric amounts of sodium metal and silicon were combined and heated to about 550° C. In general, it is preferred that sodium metal and the silicon be mixed at a 1:1 stoichiometric ratio, or in a mixture having a slight excess of silicon. At the conclusion of the experiment, there was a slight Na coating on the glass of the flask in which the reactions occurred. In addition, it is believed that about 80% of the Na reacted with the silicon during the experiment.

First run 101 shows the presence of a first exotherm extending from approximately 300-450° C. resulting in the release of about 1.0 kilojoule of heat per gram (kJ/g) of Na used. The exotherm comes to a peak at about 420° C. and returns to the baseline at about 472° C., at which point an endotherm begins to occur. The endotherm, which extends from about 472-505° C. has a trough at about 500° C., is believed to be indicative of a leeching of alkali metal from the material. A second exotherm extends from about 505-560° C., and results in the dissociation of NaSi to yield sodium metal in the amount of about 0.25 kJ/g of Na used. The dissociation of Na is believed to be the product being pyrophoric in nature because of the presence of Na metal on the surface of the NaSi material.

Thus, the DSC results of FIG. 1 clearly show that one or two reactions occur to form one or more of the silicides of sodium. After first run 101 was completed, the resulting material was re-heated a second time under the same conditions, with the results shown as second run 102. Second run 102 does not show a melting endotherm of Na at 98° C. as expected if sodium were released at approximately 550° C. in the first reaction, but does show a complex series of further reactions. The lack of a significant melting endotherm is attributed to the reaction being slow in the DSC cup, so that the decomposition reaction does not have time to occur. Evidently though, the initial formation of NaSi is followed by other reactions of various complexities.

Figure 2:
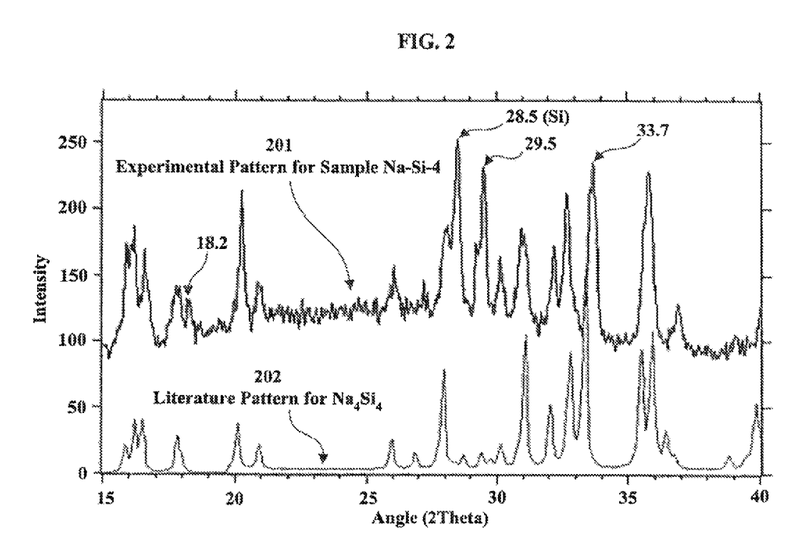
FIG. 2 shows a powder X-ray diffraction (XRD) pattern of a sodium silicide composition of the invention and $Na_4Si_4$ prepared by conventional methods.
Figure 3:
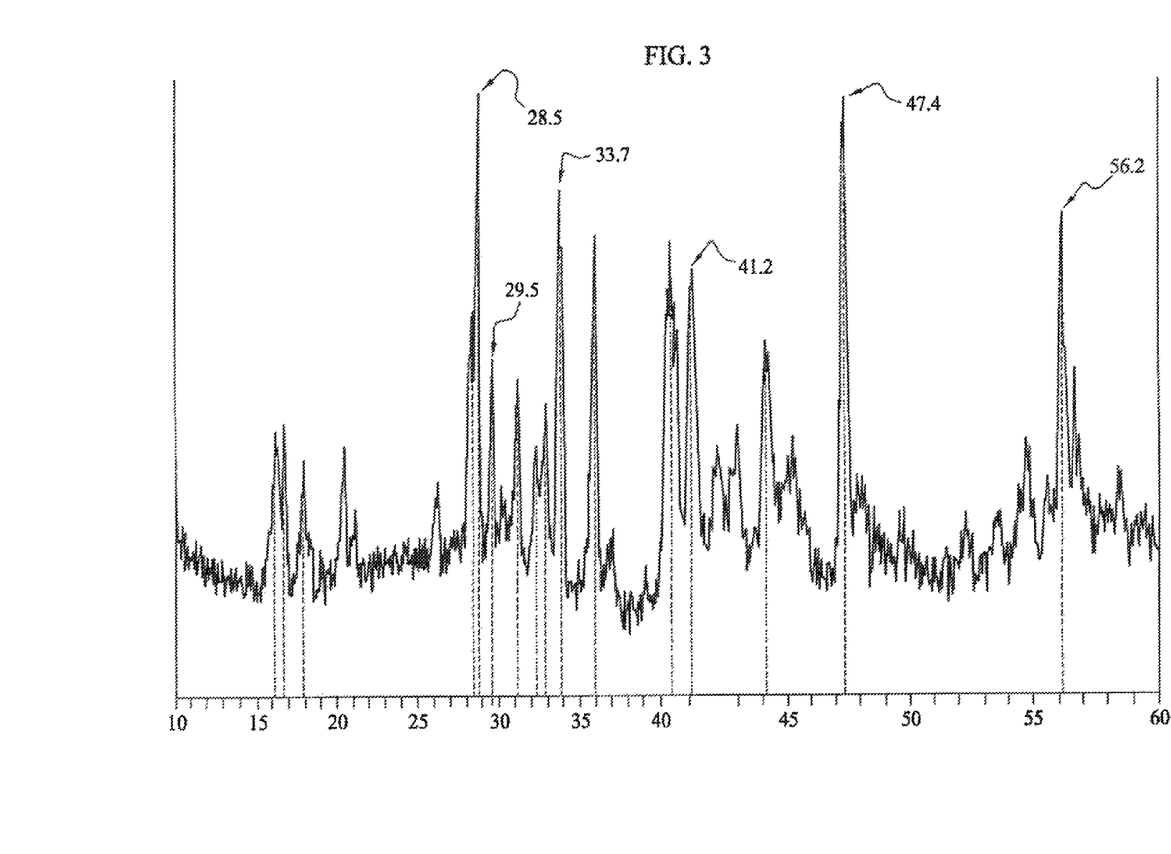
FIG. 3 shows a powder X-ray diffraction (XRD) pattern of a sodium silicide composition of the invention.
Figure 4:
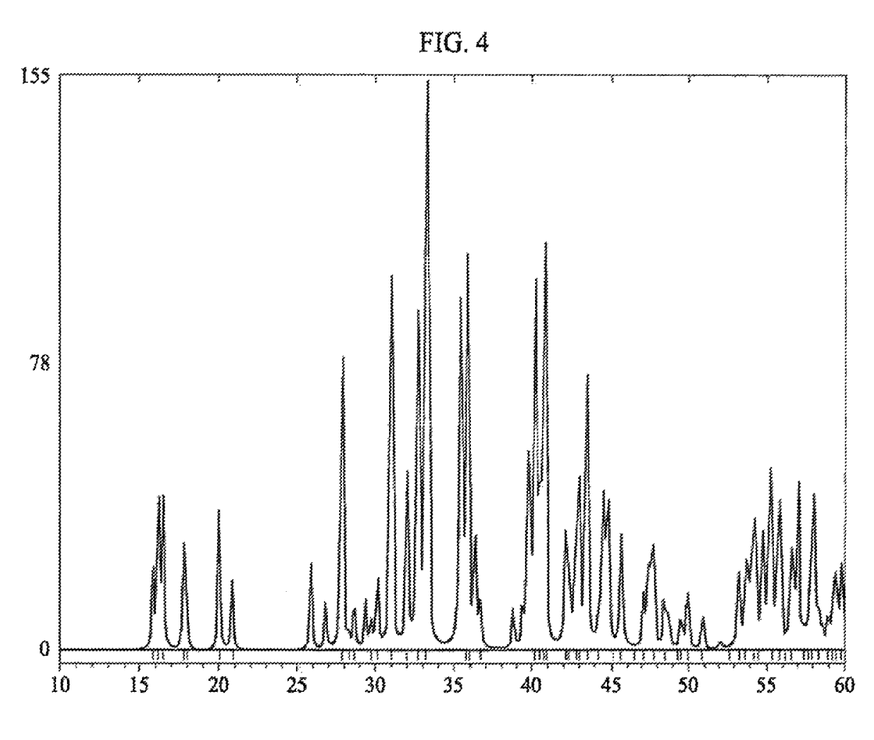
FIG. 4 shows a powder X-ray diffraction (XRD) pattern of NaSi prepared by conventional methods.

FIGS. 2 and 3 show powder X-ray diffraction (XRD) patterns of an alkali metal silicide composition material of the invention. The powder X-ray diffraction patterns were obtained using a Rigaku 200B X-ray diffractometer using a copper source. In particular, FIG. 2 shows the powder X-ray diffraction pattern of Sample Ni—Si-4 (annealed at about 400° C.) in a 0.7 mm diameter capillary tube. FIG. 3 shows a powder X-ray diffraction pattern for an additional sample.

All of the peaks of $Na_4S_4$ as calculated from the known crystal structure are present in the experimental pattern. (See Witte, J.; Schnering, H. G., "The Crystal Structure of NaSi and NaGe (in German)" Zeit Anorgan Allege Chemie 1964, 327, 260-273.). The top pattern in FIG. 2, experimental pattern 201, and the pattern in FIG. 3 indicate the presence of $Na_4S_4$ or a closely related allotrope, in addition to the formation of a different material, a mixture of $Na_4Si_4$, unreacted silicon, and other unknown products that yield at least seven extra powder diffraction lines when compared to the bottom pattern in FIG. 2, literature pattern 202, and the pattern of FIG. 4, which are powder XRD patterns for conventional NaSi. Four of the new peaks at 2Theta angles of about 18.2, 28.5, 29.5 and 33.7 are shown in experimental pattern 201 FIG. 2, and six of the new peaks at 2Theta angles of about 28.5, 29.5, 33.7, 41.2, 47.4, and 56.2 are shown in FIG. 3. The presence of these additional peaks indicates that the sodium silicide of the invention is different from known sodium silicides found in the literature.

Figure 5:
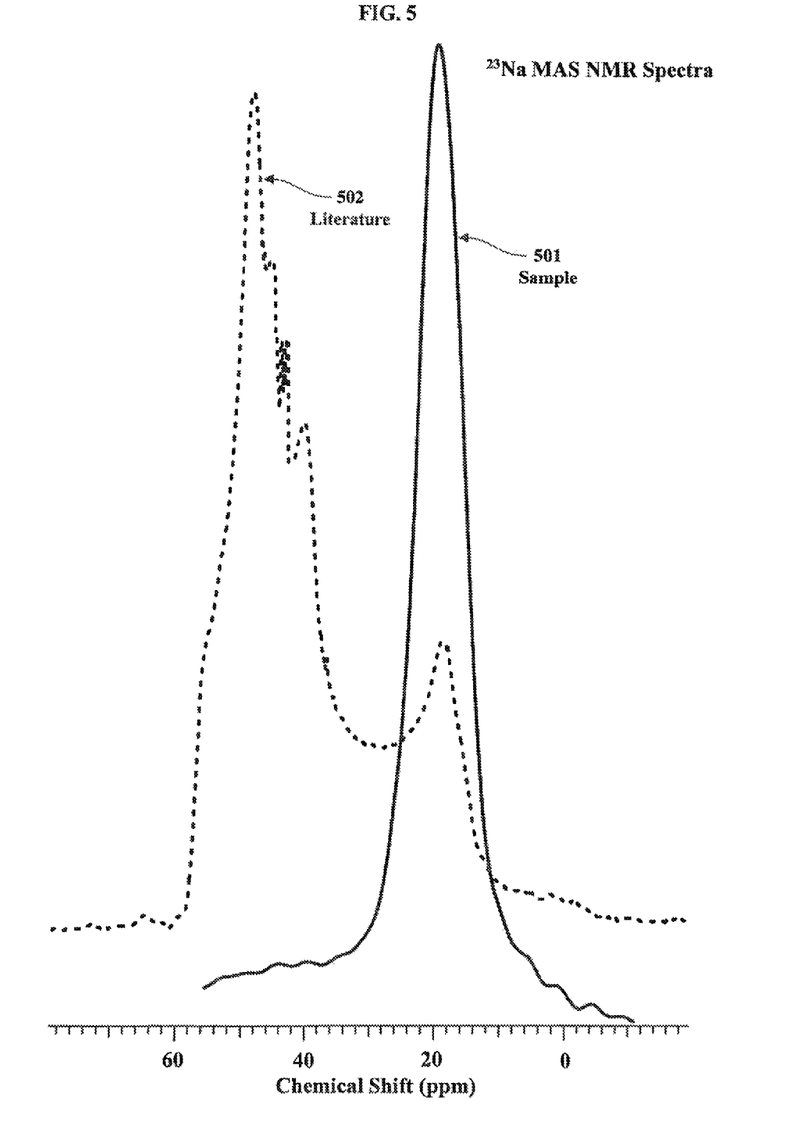
FIG. 5 shows a solid state $^{23}$Na MAS NMR spectra for a sodium silicide composition of the invention and a sodium silicide composition prepared by conventional methods.

FIG. 5 shows a comparison of the solid state $^{23}$Na MAS NMR spectrum of NaSi prepared by the methods of the invention and sodium silicide prepared by the methods given in the literature. (See He, J.; Klug, D. D.; Uehara, K.; Preston, K. F.; Ratcliffe, C. I.; Tse, J. S., "NMR and X-ray Spectroscopy of Sodium-Silicon Clathrates" J. Phys. Chem. B 2001, 105.). The solid state $^{23}$Na MAS NMR spectrum was obtained using a Varian VXR-400S Spectrometer. As is evident in the figure, the shape and chemical shift behavior are very different from those reported by the literature. Id. In particular, the NMR spectra shown in FIG. 5 show that a peak 501 for the composition of the invention occurs at approximately 18 ppm, while the peak 502 for the sodium silicide material taught by the literature has a peak at approximately 52 ppm. Clearly, the environment of most of the Na$^+$ is different in the two preparations. The normal chemical shift and symmetry of the spectrum in the composition of the invention suggests a more symmetric environment for Na$^+$ than in the Na$_4$Si$_4$ samples prepared elsewhere by a different method. This difference in chemical shift definitively established the existence of a different composition than that taught by the literature. Furthermore, it should be noted that an earlier solid state $^{23}$Na MAS NMR study observed a very broad peak near the chemical shift reported in He and very different from that observed with the composition of the invention. (See Gryko, J.; McMillan, P. F.; Sankey, 0. F. "NMR Studies of Na Atoms in Silicon Clathrate Compounds" *Phys. Rev. B*, 1996, 54, 3037-3039, and He, J.; Klug, D. D.; Uehara, K.; Preston, K. F.; Ratcliffe, C. I.; Tse, J. S., "NMR and X-ray Spectroscopy of Sodium-Silicon Clathrates" *J. Phys. Chem. B* 2001, 105.). The single rather narrow NMR peak observed during experimentation of the composition of the invention at the normal position of Na+ suggests that in the samples of the composition of the invention, the sodium ions are in a rather symmetrical environment.

Figure 6:
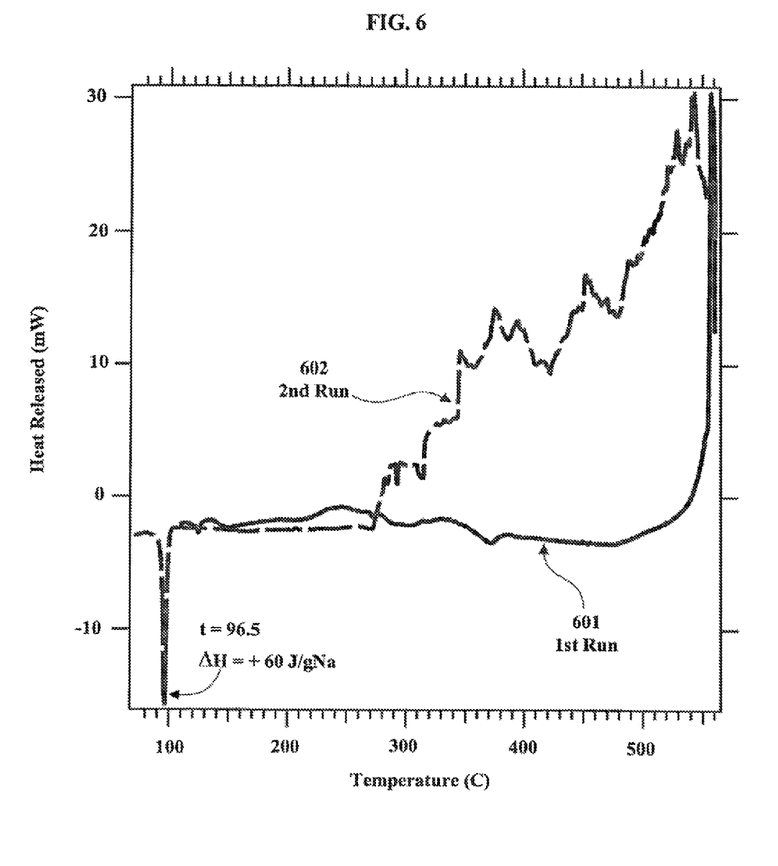
FIG. 6 shows a Differential Scanning calorimetry (DSC) pattern illustrating exothermic reactions of the NaSi product of the invention.

FIG. 6 shows two DSC traces starting with the material of the invention comprising the product of the reaction of Na with an equimolar amount of powdered Si, heated to 400° C. overnight. The first run 601 shows no melting endotherm of sodium and no significant exotherms up to 500° C., above which there is a significant exothermic reaction, probably the release of Na from Na$_4$Si$_4$ at about 550° C. This is confirmed by the second run 602, which shows an endotherm due to the melting of Na (about half of that initially used) and a substantial exotherm starting at 300° C. as a result of reaction between the released Na and the product formed by its release in the previous run.

To prevent the formation of the other materials at higher temperatures, the composition of the invention is created by heating an alkali metal and silicon mixture to a temperature below about 475° C., and most preferably, to a temperature of about 400° C., which appears to be the optimal temperature for the formation of the Na$_4$Si$_4$ composition of the invention. Compositions made at higher temperatures gave lower yields of hydrogen when reacted with water. In addition, the stability of the composition of the invention in dry air suggests that the procedures describe herein result in a "protected" product. This protection is likely due to the formation of a SiO$_2$-like coating on the material.

Accordingly, the invention relates to a method of making an alkali metal silicide composition comprising the steps of mixing an alkali metal with powdered silicon in an inert atmosphere and heating the resulting mixture up to a temperature below about 475° C., wherein the alkali metal silicide composition does not react with dry O$_2$. In this embodiment, the step of heating may be staged heating occurring over an extended period of time period of hours comprising the steps of heating the resulting mixture up to about 150° C., heating the resulting mixture from about 150° C. up to about 200° C., heating the resulting mixture from about 200° C. up to about 250° C., heating the resulting mixture from about 250° C. up to about 300° C., and heating the resulting mixture from about 300° C. up to a temperature below about 475° C. The step of heating the resulting mixture from about 300° C. up to a temperature below about 475° C. more preferably comprises heating the resulting mixture from about 300° C. up to a temperature of about 390-425° C., and most preferably comprises heating the resulting mixture from about 300° C. to a temperature of about 400° C.

The invention also relates to a method of removing a volatile or flammable substance in a controlled manner, the volatile or flammable substance being in the presence of water, the method comprising exposing the volatile or flammable substance to an alkali metal silicide composition. In this embodiment, the alkali metal silicide composition reacts exothermically with the water causing a controlled burn, thereby removing the volatile or flammable substance. In addition, the invention relates to a method of volatizing, driving off, consuming, converting to a water-miscible species, or otherwise cleaning a volatile or flammable substance in a controlled manner, the method comprising the steps of exposing the volatile or flammable substance to an alkali metal silicide composition, and exposing the alkali metal silicide composition to water. In one embodiment, the alkali metal silicide composition reacts exothermically with the water causing a controlled burn, thereby cleaning the volatile or flammable substance. Moreover, the invention relates to a method of consuming a volatile or flammable substance in a controlled manner, the method comprising the steps of exposing the volatile or flammable substance to an alkali metal silicide composition, and exposing the alkali metal silicide composition to water. In another embodiment, the alkali metal silicide composition reacts exothermically with the water causing a controlled burn, thereby consuming the volatile or flammable substance. In each of the above exemplary embodiments, it is preferred that the alkali metal silicide composition be sodium silicide. In addition, the applicability of the above-described methods is most apparent with respect to the cleaning of volatile and flammable substance which cannot be easily cleaned by conventional means, but instead require alternative means for cleaning, for example, chemical cleaning.

The material of the invention may be used to clean any non-miscible volatile or flammable materials, including oils, fuels, etc. For example, the material of the invention may be applied to an oil spill in a body of water. When the material of the invention, such as sodium silicide, contacts the surface of the water upon which the spill is located, the material reacts exothermically with the water causing a controlled burn. The ignition may cause the spill to ignite, thus combusting the spilled oil and cleaning the spill. This use is particularly advantageous because the amount of the material of the invention used is not critical. After an initial amount of the material is applied to start the combustion, additional amounts may be applied as needed to further combust the spilled substance until the desired amount is removed. The material may be applied to such as spill in many ways, for example, by spraying or dropping out of an airplane in a manner similar to crop-dusting, or from a helicopter.

In addition, the material of the invention may be placed within a water soluble storage container, for example, a water-soluble pouch, or be imbedded or encapsulated in any sort of containment material, for example, foams, polymers, porous materials, and the like, which can provide a time-released reaction with the water by delaying exposure of the material to the water. In this manner, the material may be delivered to a spill in a body of water, for example, an oil spill, by a boat, which could then leave the area prior to the start of combustion.

In addition, the material of the invention may be used to clean volatile or flammable substances in a dry environment. In this case, the material of the invention may be added to the volatile or flammable substance, for example, applied to the surface of the substance. Then, water may be introduced, for example, by spraying, to start the reaction of the material with the water and initiate combustion of the substance. Similarly, the water may be added to the volatile or flammable substance first, and then the addition of the material of the invention will initiate the combustion.

The alkali metal silicide compositions of the invention vary from free-flowing, amorphous gray-black powders, in which the particles have a dull surface, to hard particles having a diameter of about 1-5 mm. The end product varies depending on the method of preparation. The ease of handling of the product, its low moisture absorption from the air, and its rapid reaction with water to produce hydrogen combine to make this material a convenient source of high yields of pure hydrogen.

EXAMPLES

In each of the following examples, evacuable Erlenmeyer flasks were used to prepare the samples of the alkali metal silicide material. The silicon was inserted into the flask, which was then attached to a vacuum line with an UltraTorr fitting and a Kontes vacuum valve. The flask was then heated with a flame under vacuum and inserted into a helium-filled glove box, where sodium pieces were added. After removal from the box, the flask was again evacuated and the sodium pieces were melted. When the pressure stabilized at about $3 \times 10^{-5}$ torr, the tubing was sealed off above the flask and the flask and its contents were heated in a furnace overnight or longer at the desired reaction temperature. Upon completion of the reaction, the flask was again inserted into the glove box, the tubulation was broken open and the contents removed for storage and further study.

Example 1

Initial Experimentation

Although Na is known to react with borosilicate glass at temperatures above 300° C., thereby causing darkening, powdered or solid products were prepared by heating equimolar mixtures of Na and crystalline powdered Si in evacuated 50 and 125 mL Erlenmeyer flasks. Overnight heating at 500° C. yielded gray-black powders with some crushable lumps. Three separate preparations made at this temperature yielded products that were found to release $H_2$ in amounts equivalent to 0.042, 0.054, and 0.058 kg $H_2$ per kg of sample. Accordingly, it was determined that the conditions of temperature and composition may not be optimal. The literature and the DSC results in FIGS. 1 and 6 suggest that 500° C. might be too high a temperature. Accordingly, a sample was prepared by heating the mixture of sodium and silicon up to about 400° C. The resulting product gave a hydrogen yield equivalent to 0.072 kg $H_2$ per kg of sample. This yield exceeds the target yields of hydrogen proposed by the DOE for both 2005 and 2010 and is nearly equal to the year 2015 target. These results are very advantageous, especially in light of the simplicity of the preparation and the air stability of the product.

The material obtained by heating to about 400° C. produces both a solution and a black insoluble material, suggesting that the reaction of Na with Si is not complete under the stated conditions, as pure NaSi would be expected to produce products that are completely soluble in water according to a reaction such as:

Accordingly, it was determined that it might be possible to recover the unreacted Si and react it with more Na, thus increasing the ultimate yield to nearly 100% based on the Si used. To test this possibility, the residue was recovered, approximately 0.5 g, from the reaction of 1.0 grams of the second type of preparation described above with water, dried it, and reacted it with an equimolar amount of sodium at about 400° C. The resulting material yielded a quantity of hydrogen equivalent to 0.023 kg $H_2$ per kg of sample. Thus, the total yield from the original preparation was about 0.10 kg $H_2$ per kg of sample. Recovery of the unreacted material from the initial preparation of Na+Si is clearly possible.

The product of the reaction between Na and Si in borosilicate glass at 400° C. is free of sodium. This is further evidenced by the lack of a peak due to the presence of metallic sodium shown in the solid state $^{23}$Na MAS NMR spectrum of FIG. 5. The DSC of the product of reaction of Na with Si at this temperature shown in FIG. 6 shows no melting endotherm of Na. Instead, it only shows an exothermic peak at about 500° C. The repeat run clearly shows that this high temperature reaction produces sodium metal, in agreement with literature results. (Cros, C.; Pouchard, M.; Hagenmueller, P., "Two new Phases of the Silicon-Sodium System. (in French)" C. R. Acad. Sc. Paris 1965, 260, 4764-4767., and He, J.; Klug, D. D.; Uehara, K.; Preston, K. F.; Ratcliffe, C. I.; Tse, J. S., "NMR and X-ray Spectroscopy of Sodium-Silicon Clathrates" J. Phys. Chem. B 2001, 105.).

Example 2

Stability in Air

The Na—Si material of the invention reacts immediately with water to produce hydrogen and release heat in the process. However, the material is completely unreactive toward dry oxygen over a period of at least one day. Unless the relative humidity is high, the powder can be weighed in air or transferred from one container to another. A sample was exposed to laboratory air in an aluminum weighing dish and only slowly reacted with moisture. After two hours, a small amount of liquid water was added, and the black pieces immediately evolved hydrogen. It is likely that the methods described herein for preparation of the composition of the invention result in an alkali metal silicide that is protected by a surface layer of silicon dioxide or some other composition. In any event, the resulting material is easy to handle in air, which results in the ability to produce hydrogen on demand.

These results demonstrate that it is straightforward to produce a stable powdered or granular material that likely contains a silicide with the stoichiometry NaSi, together with an unknown amount of other substances (possibly glassy $SiO_2$ and unreacted silicon). The product, while stable in dry air and only slowly reactive in moist air, produces large yields of hydrogen when introduced into liquid water. The gaseous product is pure hydrogen, uncontaminated with anything except water vapor and small amounts of silanes such as SiH$_4$. Thus, the material is an excellent source of hydrogen for use in fuel cells.

Example 3

Reaction Between Sodium and Silicon Powder at 500° C.

Sample Na—Si-1 was prepared by introduction of 0.56 g of powdered crystalline silicon (Alfa Aesar, 325 mesh) into an evacuable Erlenmeyer Flask. After outgassing under vacuum with a gas-oxygen torch (~300° C.). the flask was put into a helium-filled glove box and 0.46 g. of sodium metal was added. After evacuation and melting of the sodium, the stem of the flask was sealed off under vacuum and the flask and contents were heated in a furnace for 2 hrs at 300° C., 22 hrs at 400° C. and 48 hrs at 500° C. The Pyrex flask became dark brown-red in the process and the product consisted of both powder and small hard lumps. In the glove box, 0.66 g of product was recovered. A 24.5 mg sample produced 0.517 millimoles (mmol) of hydrogen upon addition of water. This corresponds to 0.0423 kg of H$_2$ per kg of sample. If the hydrogen is produced only from sodium silicide, the amount corresponds to 43% Na$_4$Si$_4$.

Example 4

Recovery of Residue from the Product of the Invention

The second preparation of Na+Si (Sample Na—Si-2) corresponded to 55% Na$_4$Si$_4$ according to the yield of hydrogen. A 1.0 g sample of the product was reacted with water in a nitrogen-filled glove bag, with copious amounts of hydrogen produced. The reaction left a black residue that could not be recovered by centrifugation because slow evolution of gas continued to cause mixing. The continued evolution of hydrogen would be expected in this basic solution if the residue contained elemental silicon. The product was neutralized with HCl, washed by repeated centrifugation and dried. The resulting black powder (0.49 g) was again reacted with Na at 500° C. and produced 0.021 kg of H$_2$ per kg of sample.

Example 5

Preparation of the Highest-Yielding Sample (Sample Na—Si-4)

As shown in FIG. 1, it became apparent from the Differential Scanning calorimetry (DSC) experiments on the heat evolved in the reaction of Na with Si that there were two exothermic processes occurring. It is believed that, after formation of Na$_4$Si$_4$ at around 400° C., further heating caused dissociation of the product with the formation of Na metal and other silicides. This result was somewhat surprising since pure Na$_4$Si$_4$ is generally prepared at or above 500° C. To test whether preparation at 400° C. instead of 500° C. increases the yield of the product of the invention, a sample was prepared as described in Example 3, except that the flask and its contents were heated to 400° C. overnight. The resulting product had fewer lumps and gave a hydrogen yield that corresponded to 73% Na$_4$Si$_4$. The DSC of this sample shown in FIG. 6 confirmed the formation of sodium upon heating to 560° C. and showed that an exothermic reaction resulted upon re-heating, which is believed to be the result of re-formation of sodium silicide.

In particular, FIG. 6 shows Differential Scanning calorimetry (DSC) traces of the reaction of 4.9 mg of Na with 5.0 mg of Si. The mass of Na was determined from the measured heat of melting. It is likely that the exotherm with a peak at 400° C. is due to the formation of Na$_4$Si$_4$ and that further heating causes a secondary reaction. As a result, second run 602 shows further reactions of the various products formed in first run 601. Second run 602 shows no melting endotherm of free sodium. This contrasts with the behavior of a pre-formed sample, annealed at 400° C. which releases Na when heated to 550° C. in the DSC cup. It is likely that the reaction to form Na$_4$Si$_4$ in the DSC cup is slow, so that the second reaction to release sodium does not have a chance to occur during the short time of the DSC experiment.

Example 6

Preparation of Potassium Silicide (KSi) Material

The KSi material was produced by first mixing stoichiometric amounts of powdered (350 mesh) Si from Sigma-Aldrich with K metal chunks in an Erlenmeyer flask, equipped with a stem to attach to the vacuum line. This was done in a He-filled glove box. The He was pumped off and the mixture heated with a flame until the K melted and the system was outgassed to ~10-5 Torr, at which point the Pyrex stem was sealed-off with a flame. The Erlenmeyer was then put into a muffle furnace and heated for about two hours each at 150° C., 200° C., 250° C., 300° C., and 350° C. and then overnight at 400° C. The tube was broken open in the glove box and the product was scraped off the walls. The material consisted of powder and chunks and the latter were ground up into a fine powder. A sample removed from the glove box was poured into an aluminum weighing dish and exposed to laboratory air. It reacted slowly, if at all, with no heating or flame. But when a bit of powder was dropped into a beaker of water it ignited immediately.

The yield of hydrogen upon reaction with water indicated only about a 50 percent (50%) conversion to KSi, which indicates that a longer reaction time or better agitation during preparation is necessary. Accordingly, it is expected that optimization of the conditions of synthesis will lead to yields comparable to those achieved with the sodium silicide compositions of the invention.

What is claimed is:

1. An alkali metal silicide composition prepared by:
    mixing an alkali metal selected from sodium and potassium with powdered silicon in an inert atmosphere and heating the resulting mixture to a temperature from 150° C. up to 500° C.,
wherein the alkali metal silicide composition is stable in dry air and reacts with water,
wherein the alkali metal silicide composition is a sodium silicide powder or a potassium silicide powder.

2. The alkali metal silicide composition of claim 1, wherein the alkali metal silicide composition comprises Na$_4$Si$_4$ or K$_4$Si$_4$.

3. The alkali metal silicide composition of claim 1, wherein the molar ratio between the alkali metal and the silicon is about 1:1.

4. A method for producing hydrogen gas comprising the step of contacting an alkali metal silicide composition of claim 1 with water.

5. An alkali metal silicide composition having a 1:1 molar ratio of alkali metal to silicon wherein the alkali metal is selected from sodium or potassium and the alkali metal silicide composition is stable in dry air.

6. An alkali metal silicide composition of claim 5 which reacts with water.

7. A method for producing hydrogen gas comprising the step of contacting an alkali metal silicide composition of claim 5 with water.

* * * * *